(12) United States Patent
Freudelsperger

(10) Patent No.: US 6,733,222 B2
(45) Date of Patent: May 11, 2004

(54) COMMISSIONING SYSTEM WITH PRODUCT STORAGE COMPARTMENTS DISPOSED IN A SHELF AND WITH A POSITIONABLE EJECTOR UNIT

(75) Inventor: Karl Freudelsperger, Hart bei Graz (AT)

(73) Assignee: Knapp Logistik Automation GmbH, Hart bei Graz (AT)

(*) Notice: Subject to any disclaimer, the term of this patent is extended or adjusted under 35 U.S.C. 154(b) by 40 days.

(21) Appl. No.: 10/221,594

(22) PCT Filed: Mar. 14, 2001

(86) PCT No.: PCT/EP01/02865

§ 371 (c)(1),
(2), (4) Date: Sep. 12, 2002

(87) PCT Pub. No.: WO01/70602

PCT Pub. Date: Sep. 27, 2001

(65) Prior Publication Data

US 2003/0034356 A1 Feb. 20, 2003

(30) Foreign Application Priority Data

Mar. 19, 2000 (DE) .......................... 100 12 942

(51) Int. Cl.$^7$ ................................ B65G 1/00
(52) U.S. Cl. ......................... 414/276; 211/188
(58) Field of Search ................ 414/276; 211/151, 211/188, 144, 59.2; 193/4, 25 A, 25 FT

(56) References Cited

U.S. PATENT DOCUMENTS

| 3,647,080 A | | 3/1972 | Denny | |
|---|---|---|---|---|
| 4,613,270 A | * | 9/1986 | Konstant et al. | 414/276 |
| 5,141,118 A | * | 8/1992 | Gay | 211/151 |
| 5,419,444 A | * | 5/1995 | Strom | 211/151 |
| 5,447,407 A | * | 9/1995 | Weaver et al. | 414/276 |
| 6,431,378 B1 | * | 8/2002 | Lewis | 211/151 |

FOREIGN PATENT DOCUMENTS

EP          0 403 726          12/1990

* cited by examiner

Primary Examiner—James R. Bidwell
(74) Attorney, Agent, or Firm—McGlew and Tuttle, P.C.

(57) ABSTRACT

A commissioning system (1) is provided with product storage compartments (2) vertically to horizontally disposed in a shelf, in which products are stacked. The product right at the bottom of such a stack of a selected product storage compartment can be ejected by a positionable ejector unit (4) in a direction transverse to the shelf. The inventive system is further characterized in that the shelf (5) is configured as a frame/component system, especially as a frame and plug-in modules system, which comprises modular elements. The shelf is variable in terms of height, width and/or length and can optionally be extended by adding modular elements.

27 Claims, 8 Drawing Sheets

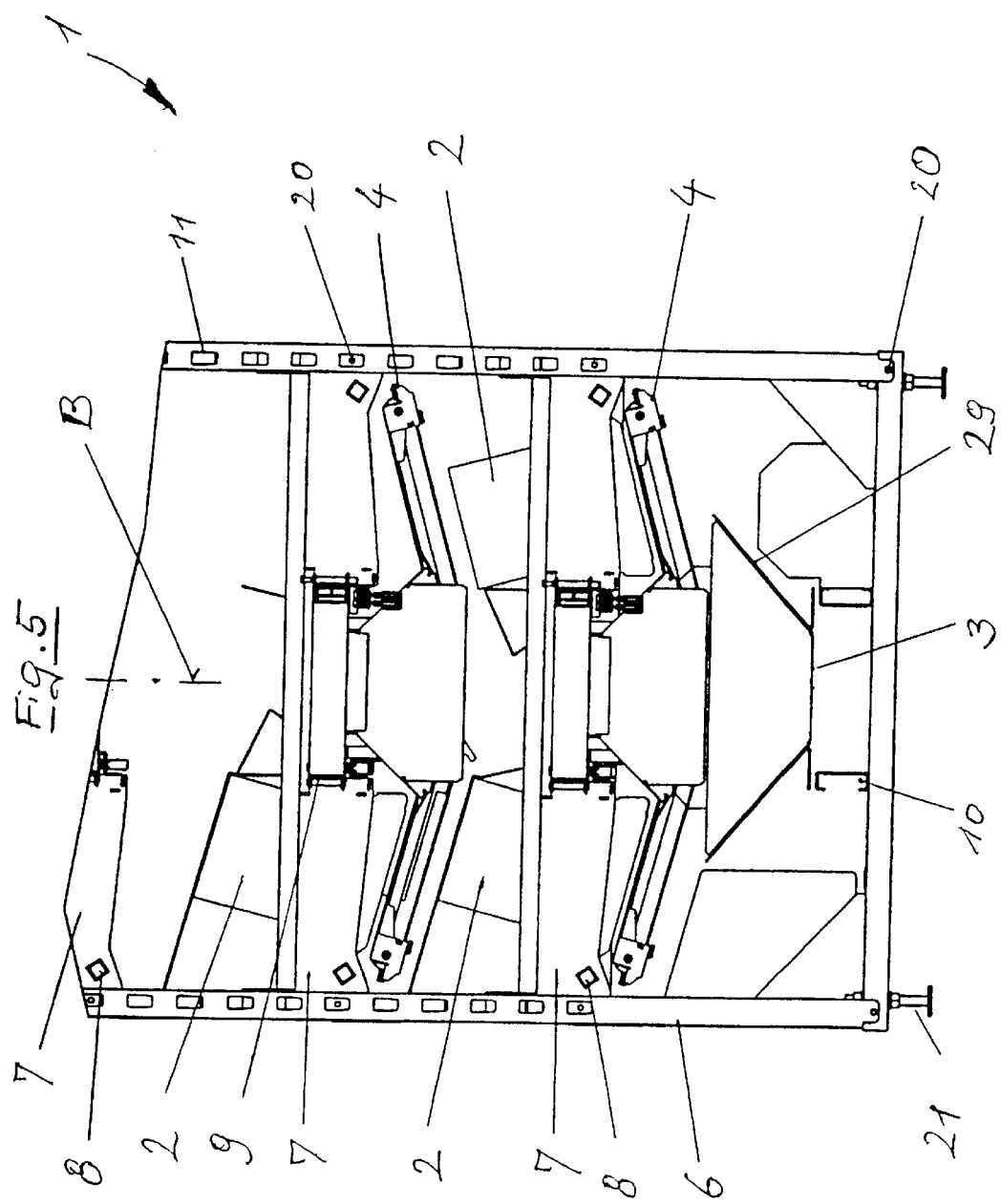

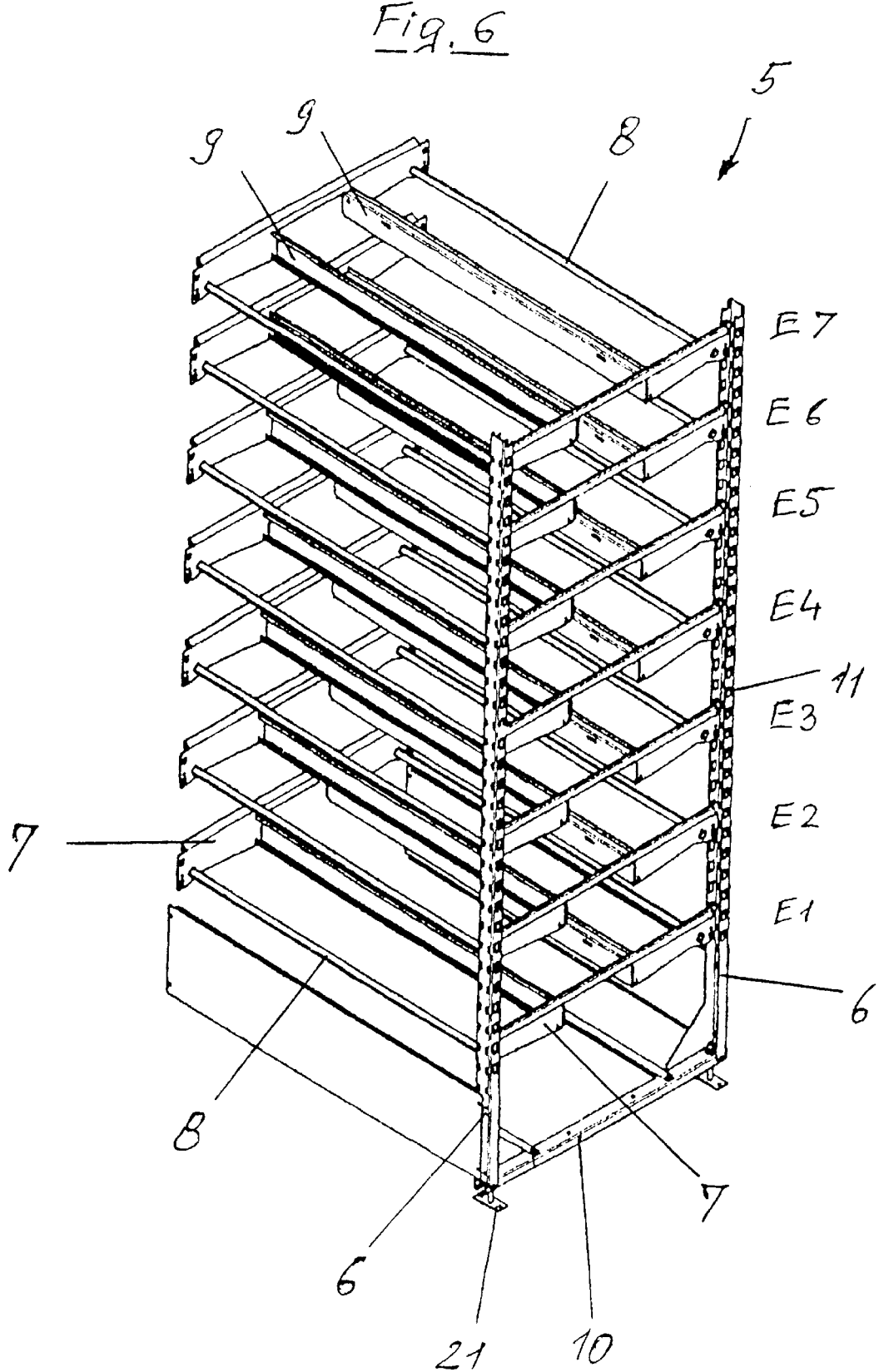

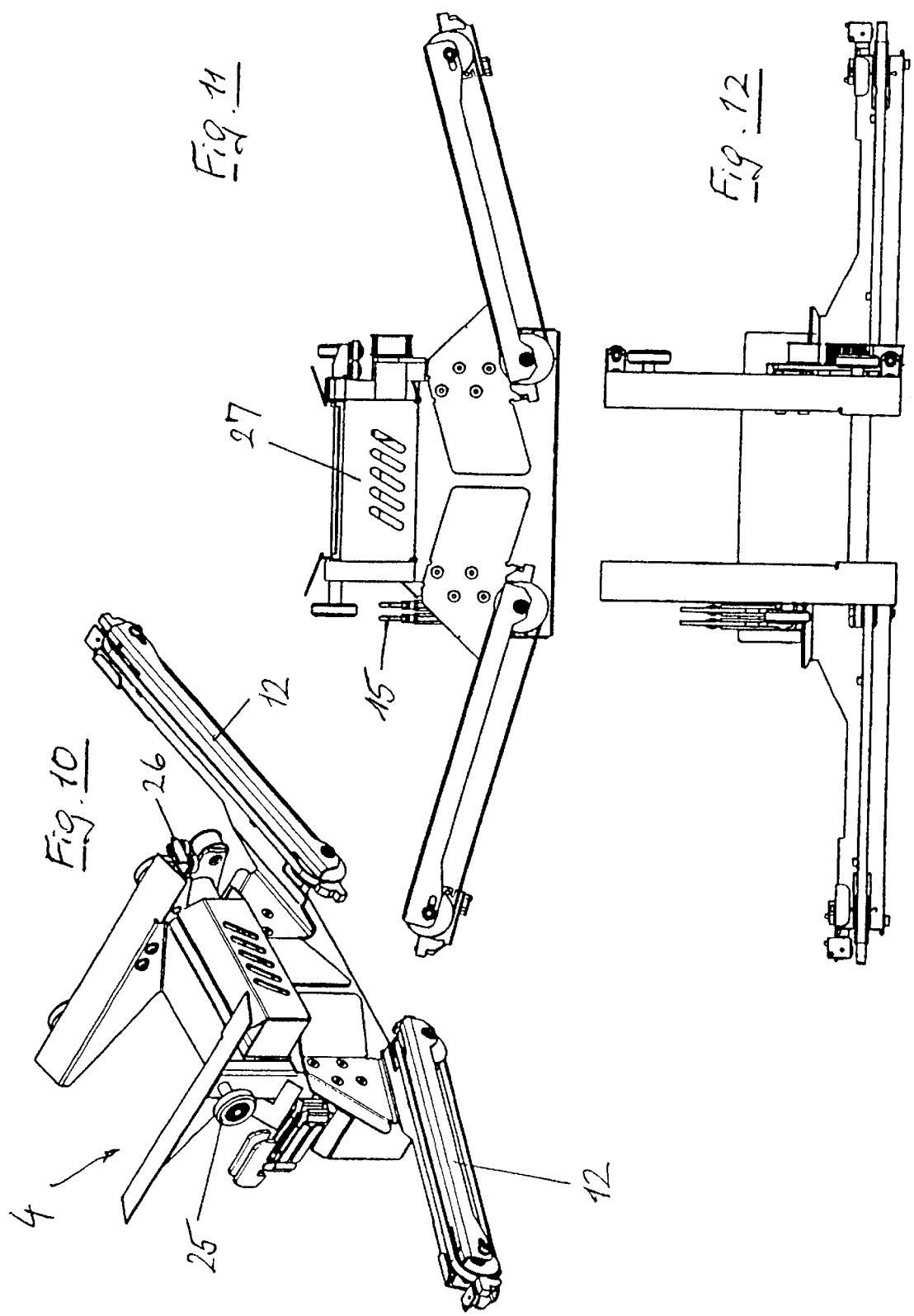

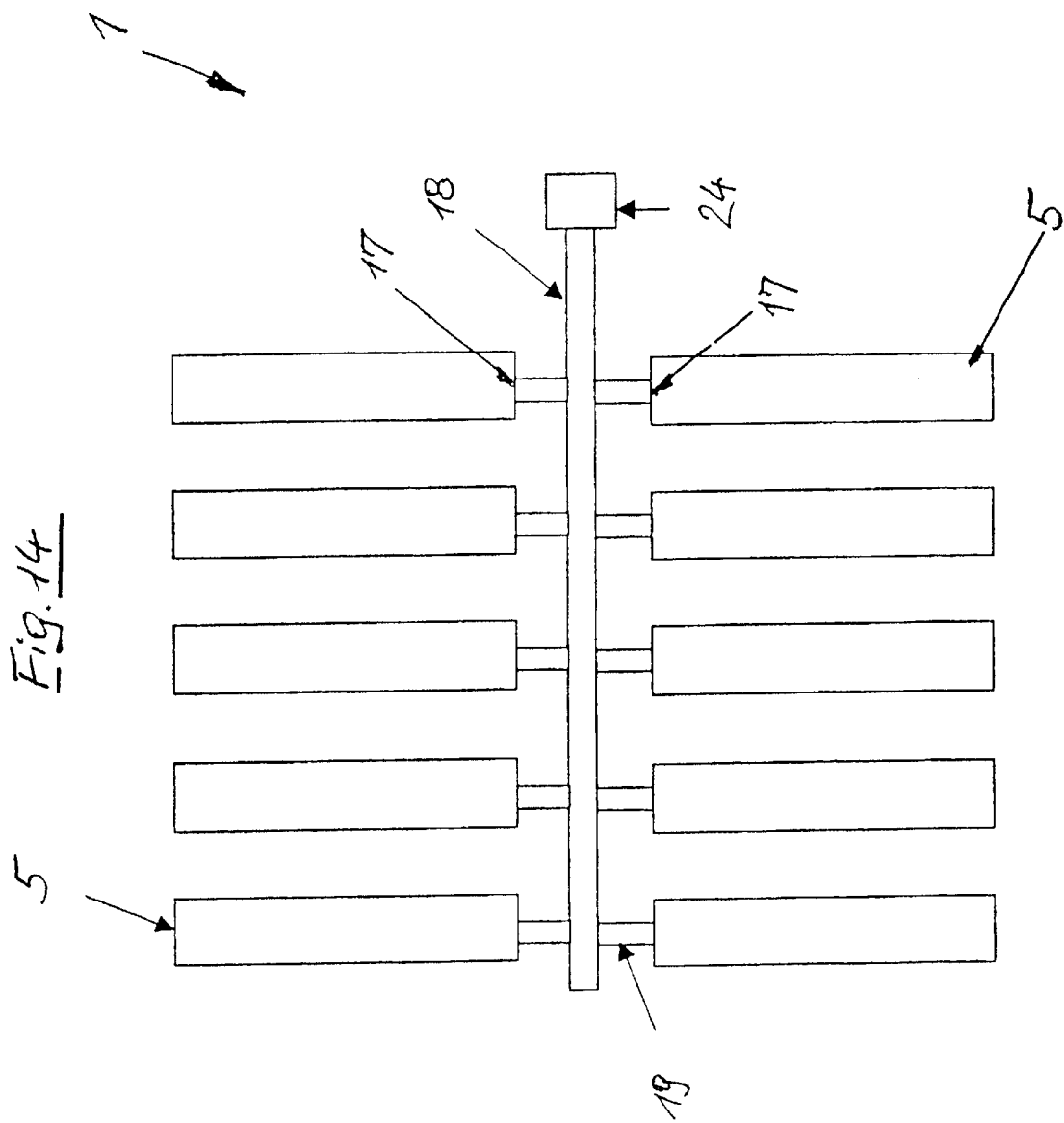

COMMISSIONING SYSTEM WITH PRODUCT STORAGE COMPARTMENTS DISPOSED IN A SHELF AND WITH A POSITIONABLE EJECTOR UNIT

FIELD OF THE INVENTION

The present invention pertains to a commissioning device with product storage units arranged in positions ranging from vertical to horizontal, in which products are stacked, arranged one on top of another or next to each other in a row, wherein the product of a selected product storage unit, which product is the lowermost or frontmost in the stack, can be pushed out in the transverse direction of the shelf by a positionable ejector unit or push-out unit.

BACKGROUND OF THE INVENTION

A commissioning device of the above-mentioned type has been known from, e.g., EP 0 403 726. The shelf is preferably designed as a double shelf back to back, is gently sloped to the vertical, and has an A-shaped front view, and a longitudinal conveyor belt is arranged at least at the base of the "A", and a plurality of push-out planes may be provided at different levels, with which additional longitudinal conveyor belts may be associated.

SUMMARY OF THE INVENTION

The object of the present invention is to provide a commissioning device of the type mentioned in the introduction, which has a simple design and can be used in various variants in a versatile manner and is characterized, in particular, by simple and rapid mounting of the shelf.

The essence of the present invention is that the shelf is provided as a frame components system, especially as a plug-in frame system and it comprises modular individual components, and the shelf can be built variably in terms of height, width and/or length and can be optionally expanded by attaching additional modular individual parts.

The shelf is preferably composed of at least four vertical supports of identical design, a plane that can be suspended and at least two cross struts of identical design, which can be brought into a preferably positive-locking plug-in connection with the vertical supports in a selected position, as well as at least one longitudinal strut, and it has at least one guide rail, on which the push-out unit is guided movably along the shelf at a selected product storage unit and is fastened. If this design variant is based on the above-mentioned minimum numbers of pieces for vertical supports, cross struts and longitudinal struts, this leads to the simplest form of a commissioning device in the form of a shelf module with integrated guide rail and a push-out unit, which makes commissioning possible in one push-out plane in the case of a plurality of product storage units arranged in a row in the shelf. The above-mentioned individual parts of the shelf form a sufficiently stable structure in the mounted state of the shelf including the guide rail and a plurality of product storage units.

In the case of longer vertical supports, the aforementioned shelf can be expanded upward with additional cross struts and longitudinal struts and additional guide rails with additional push-out units at equal overall length. At least one second push-out plane, which can be operated independently from the first push-out plane, is embodied in this case, without the push-out units interfering with one another during their longitudinal movements during commissioning.

However, the shelf can also be expanded in its overall length, which is achieved by attaching additional vertical supports, cross struts and longitudinal struts. The guide rail is extended in this case by an extension piece or, which is better for the stability and the function of the entire system, by a correspondingly longer guide rail, on which at least one push-out unit is longitudinally displaceable. Commissioning in one push-out plane is now possible over a greater length at a larger number of product storage units.

It is apparent that the above-mentioned expansion of the shelf in terms of height and length and optionally width according to the modular principle may be continued, in principle, up to commissioning units the size of a shop, where it is possible, e.g., not only to embody many push-out planes in height, but even to set up a second or third operator plane on the side of the high shelf for a person to walk on.

It is especially advantageous for the shelf to additionally comprise a fastening rail with a longitudinal conveying means extending in the longitudinal direction of the shell, especially with a longitudinal conveyor belt, on which a commissioned product pushed out by the positioned push-out unit can be given out and removed. In this case, the commissioned products do not fall under the shelf into a container made ready, especially in case of a short overall length of the shelf, but the products, sorted according to commission or according to an order, are conveyed to a remote location, depending on the local individual conditions.

Longitudinal conveyor belts may be provided in different push-out planes. In particular, a separate longitudinal conveyor belt may be associated with each push-out plane.

At least the vertical supports, the cross struts, the longitudinal struts and the push-out unit are preferably modular individual parts, which may also be used multiply in various sizes or lengths within the framework of a comprehensive modular system to individually shape a commissioning device, and, in particular, a layman or the user of a commissioning unit can also install especially the shelf of the commissioning device for the most part himself in a reliable manner and in a short time.

An especially advantageous commissioning device is characterized in that at least one additional shelf is connected to a shelf, which is provided with a guide rail, a push-out unit, a buffer storage area and optionally a longitudinal conveyor belt as a so-called commissioning shelf according to the frame components system, especially the plug-in frame system, preferably in a plug-type connection, or such an additional shelf is associated with the shelf, the additional shelf being designed as a so-called non-commissioning shelf without push-out unit and preferably also without product storage unit, without guide rail and also without longitudinal conveyor belt, and having, instead, flat shelf bottoms arranged preferably on the cross struts, preferably at a different level, on which bottoms products can be arranged, intermediately stored and handled. Such a commissioning device consequently comprises individual parts, many of which are of an identical structure and consequently have the same optical appearance, and individual shelves are commissioning shelves and other shelves are non-commissioning shelves basically in the form of storage shelves which are known per se, but are built according to the modular principle according to the present invention.

Such non-commissioning shelves can be made according to the present invention into a commissioning shelf with especially simple means, i.e., they can be converted if the user so desires. Only the flat shelf bottoms must be removed in this case, the product storage units are inserted instead into the modular basic frame comprising the above-mentioned vertical supports, cross struts and longitudinal struts, and the push-out units are installed, optionally also with guide rails and longitudinal conveying means, unless they are already installed in a non-commissioning shelf.

Likewise, commissioning shelves can preferably be converted according to the present invention into additional shelves, i.e., into non-commissioning shelves with simple means if the user so desires. Consequently, a user can, e.g., expand an already installed, small commissioning unit comprising a few commissioning shelves and a few non-commissioning shelves practically as desired, and the function of the non-commissioning shelves can be changed to that of commissioning shelves to expand the capacity of the entire unit, without the basic structure and the site of fastening of the unit having to be changed, doing so with astonishingly simple and consequently inexpensive means. If, furthermore, the user wishes to change the function of existing commissioning shelves, so-called dynamic shelves, into that of non-commissioning shelves, so-called static shelves, this is likewise possible according to the present invention with simple and inexpensive means. Consequently, the user sees that the present invention offers practically any desired variety of variants and any desired possibility of shaping one or more commissioning units with very simple means.

It is highly advantageous for the vertical supports to be stable and also lightweight profile strips that can be manufactured at a low cost with holes located preferably at equal distances from one another, in which end-side hook elements of the cross struts can be suspended, preferably in a positive-locking manner.

The profile strip has, especially in its cross section, a U shape, and both the base and the two legs of the U-shaped profile strip have preferably equidistant holes or openings for suspending a cross strut or a longitudinal strut. Such a profile strip is, aside from the length, which corresponds to the height of an individual shelf of the commissioning device and can be optionally cut to size correspondingly by cutting—is a universal strip, which can be used for both an angular corner connection of a shelf frame and a flat T-shaped extension connection of a shelf frame.

The cross struts may optionally also be bolted to the vertical supports and/or fastened or secured by securing pins, and the longitudinal strut(s) may likewise be preferably firmly fastened, especially bolted, to the cross struts. The stability of the shelf results from the assembly and optionally final bolting together of the individual parts.

The product storage units can be fastened at the cross struts and/or longitudinal struts, especially by means of a plug-in connection.

The product storage units themselves may be designed as magazines that can be fitted together, with a bottom-side product support and at least two side walls located at spaced locations from one another, which are preferably essentially vertical angle sections. The magazines may have different heights.

The distance between the spaced-apart side walls of the magazine, which can be fitted together, can be set to or coordinated with the width of the product, and the product width set or a plurality of product widths set preferably correspond to the horizontal distance between two adjacent cross struts. The aforementioned distance also corresponds to the length of one shelf module, comprising mainly the above-mentioned modular individual parts.

The product storage units, arranged in a longitudinal row, are preferably sloped relative to the vertical direction for an obliquely downwardly directed pushing-out movement of a product, which is the lowermost product in the stack, in the transverse direction of the shelf.

The cross struts may be arranged at different levels, and every individual level defines a push-out plane with associated product storage units, guide rail and push-out unit, and a separate longitudinal conveying means extending in the longitudinal direction of the shelf may be associated with each push-out plane.

A cross conveying means for the product, which is a rigid part of the shelf and is preferably a chute, and an ascending belt or a buffer hopper, may be provided between the push-out opening of the product storage unit and the longitudinal conveying means.

The push-out unit is preferably arranged in a suspended manner and longitudinally movably at the guide rail, and a plurality of push-out units may also be provided at a single guide rail.

The push-out unit has at least one push-out means for pushing out the lowermost product of the stack of a selected product storage unit in the transverse direction of the shelf, and it optionally has a separate, activatable longitudinal drive as well as a separate, activatable cross drive for the push-out means, and the longitudinal drive may also be fastened to the shelf and may be connected to the push-out unit via a drive, preferably a toothed belt drive. A chain or a V-belt drive may also be considered.

Furthermore, the push-out unit is supplied with electricity from a battery or via electric sliding contacts and a conductor rail arranged on the longitudinal side of the shelf.

The activation of the push-out unit, which is necessary for commissioning, is performed by means of a data light barrier, radio or by modulation from the conductor rail.

The shelf may be designed as a double shelf with at least one middle guide rail and at least one middle longitudinal conveying means, in which case the push-out unit has two preferably identical push-out means, which have a mirror-inverted design relative to the vertical longitudinal central plane of the double shelf, and each push-out means is associated with one half of a double shelf.

A plurality of shelves and/or double shelves may be arranged in parallel to one another and/or opposite one another, and each outlet of a longitudinal conveying means located on the longitudinal side of the shelf may be connected to a collecting conveying means, which preferably extends at right angles to the longitudinal conveying means and is preferably a central conveyor belt of shelves arranged opposite each other or a lateral conveyor belt of shelves arranged in parallel. Shelf rows may also be arranged one behind another.

A connecting conveying means, especially an ascending belt, a chute or a buffer hopper may be optionally arranged between the outlets of the longitudinal conveying means and the collecting conveying means. The longitudinal conveying means and/or connecting conveying means may contain activatable product stoppers that can be actuated.

The shelf or shelves may have at least one walkable operating platform, which may be preferably arranged at a different level laterally from the shelf and/or at the longitudinal end of the shelf, preferably by means of a plug-in connection.

In addition or as an alternative, the shelf or shelves may have at least one shelf ladder for a human operator, which can be laterally displaced or suspended.

The guide rail comprises, in particular, at least at one longitudinal end of the shelf, an openable stop for a longitudinally movable push-out unit, preferably a guide rail piece that is pivotably articulated to the end of the guide rail and that forms a stop in a transverse position for the push-out unit on the guide rail and releases the push-out unit in a preferably aligned longitudinal position, and especially establishes a connection to a service site or exchange site for push-out units.

The push-out unit in the form of an ejector vehicle comprises a motor with a corresponding transmission and drive system for moving the ejector vehicle along the guide rail, e.g., by means of a belt system. A plurality of ejector vehicles per plane may be used simultaneously.

The drive motor may also be arranged externally on the shelf frame.

Variable, adjustable magazines may be used as product storage units, as they are described, e.g., in AT Patent No. 404124. The product storage units are arranged laterally in parallel to one another in the longitudinal direction of the module.

The data transmission/communication may take place via a data light barrier with or without order data buffering, radio or by modulation by means of the energy supply.

The function will be described below.

After the transmission of an order with n positions and n ejections per position via the data light barrier or another of the aforementioned possibilities of transmission to the ejector vehicle, the latter starts out from the order start position into the first order position.

The products are ejected from the product storage unit into the middle of the aisle by means of the studded belt on the ejector of the ejector vehicle. The products drop onto the conveyor belt by a limited, defined fall by means of the cascade plates. Depending on the design, the products are pushed via this conveyor belt onto a central belt in a directly order-related manner or they are pushed together onto a short area of the conveyor belt by means of a buffering device and are then conveyed onto a central belt or collecting belt in an order-related manner.

Instead of onto a central belt, the products may also be transferred directly into the container via a buffer hopper in an order-related manner.

After the end of the travels needed for handling the orders, the ejector vehicle returns into its order start position. This return travel to the order start position depends on the variant of the data transmission used and can be avoided or optimized to increase the throughput.

The control of the shelves as well as the higher-level control are performed by means of software.

The arrangement is such that the automatic system may be arranged as a single aisle, as a system of n aisles in an overall system design with materials handling connections and in connection with other commissioning systems.

The product storage units are refilled manually, but the refilling may also be performed automatically corresponding to the design of the product storage unit.

The modular design makes it possible to replace individual parts of the frame system, the commissioning system and the materials handling technology in a simple manner. Furthermore, it is possible to remove the ejector vehicles from the system of planes by means of a variable drive and installation system and to replace them with a replacement vehicle.

Consequently, a plurality of vehicles can eject products from a plurality of planes independently from one another.

The modular plug-in system of the shelf is suitable for modularly receiving other types of automatic units. Rapid, simple replacement of the vehicle, which contains most of the drive mechanism and the control technology, is possible.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is an enlarged view of a detail from FIG. 4;

FIG. 6 is a perspective view of a part of the shelf according to FIG. 1;

FIG. 10 is a perspective view of the push-out unit according to FIGS. 1 and 5;

FIG. 11 is a front view of the push-out unit according to FIGS. 1 and 5;

FIG. 12 is a top view of a push-out unit according to FIGS. 1 and 5;

FIG. 14 is a schematic view of the arrangement of a commissioning device according to FIG. 1 with a plurality of shelves and a common central collecting conveyor belt.

DESCRIPTION OF THE PREFERRED EMBODIMENTS

Figure 1:
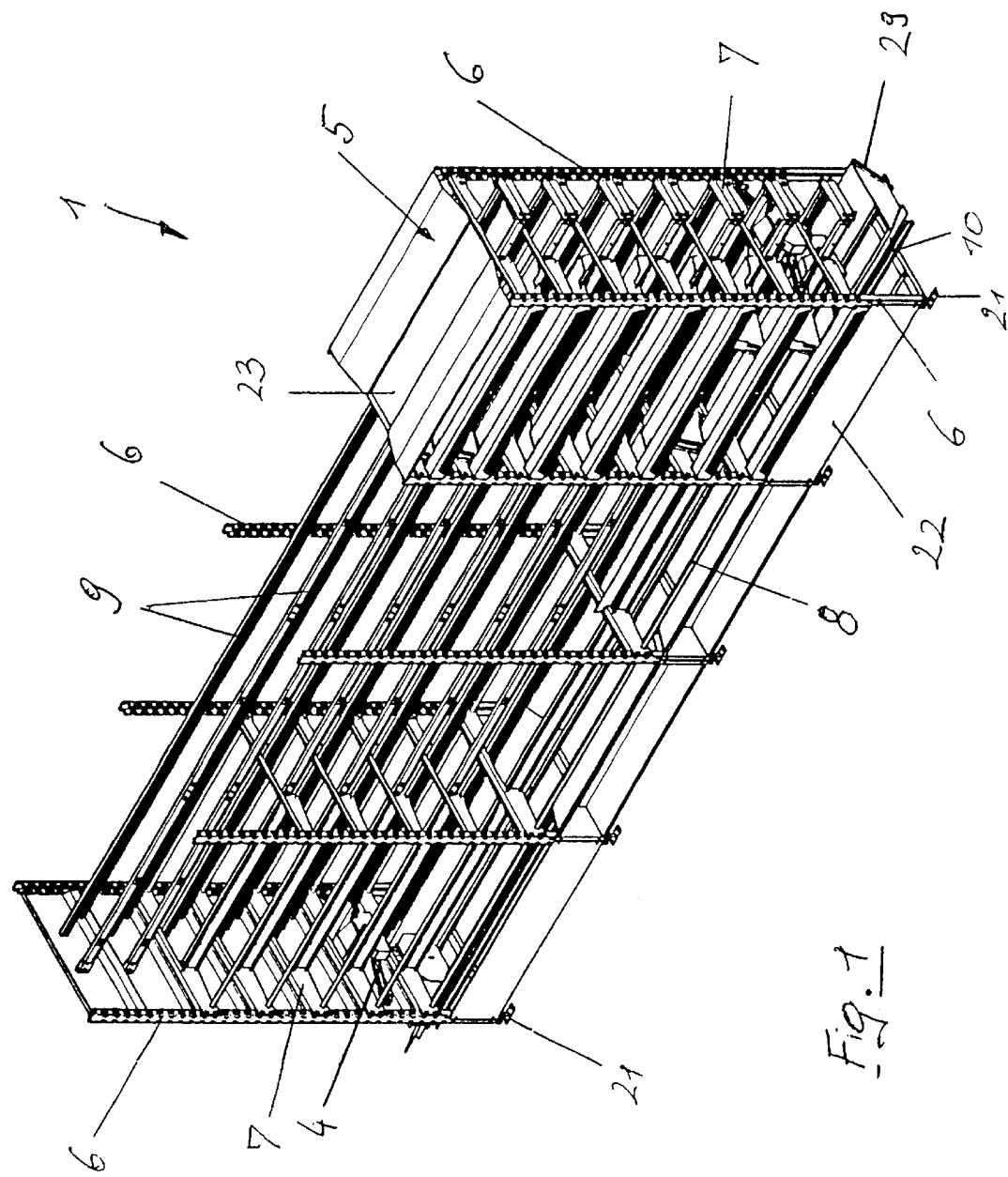
FIG. 1 is a perspective view of a partially cut-away commissioning device with a shelf with vertical supports, cross struts, longitudinal struts, guide rails and push-out units.
Figure 2:
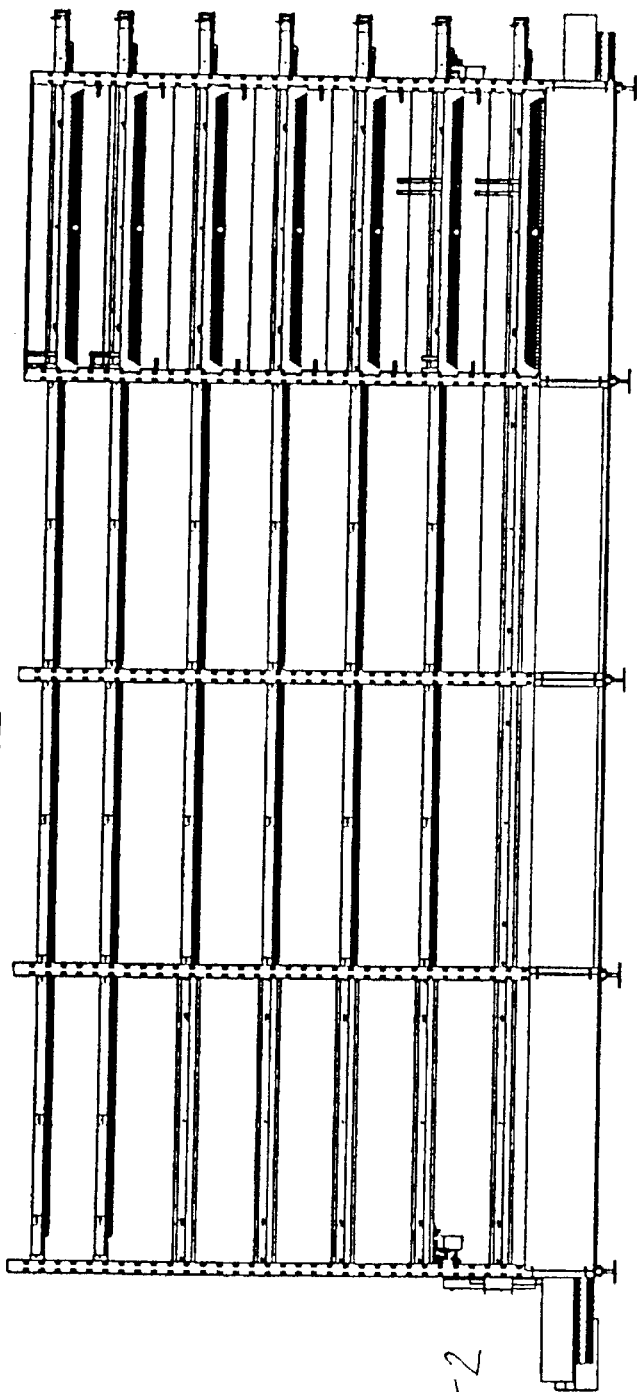
FIG. 2 is a side view of the commissioning device according to FIG. 1.
Figure 3:
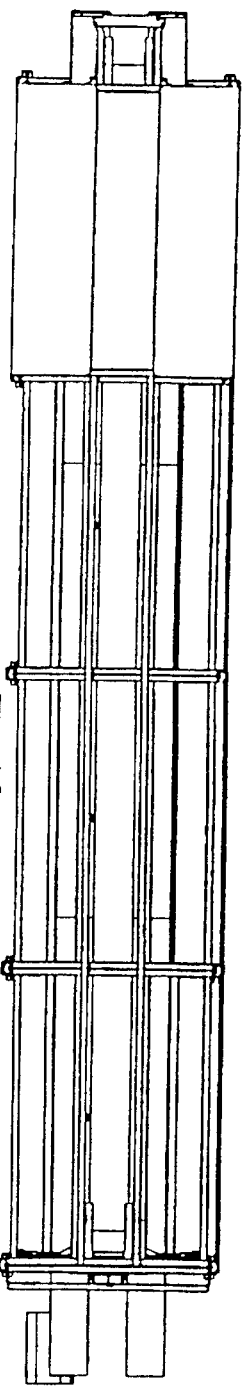
FIG. 3 is a top view of the commissioning device according to FIG. 1.
Figure 4:
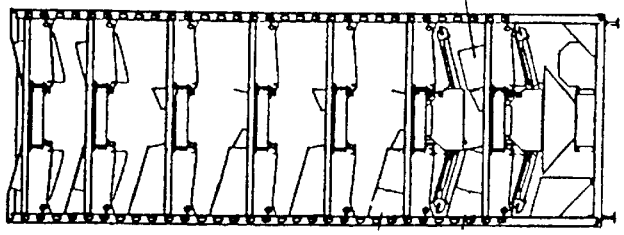
FIG. 4 is a front view of the commissioning device according to FIG. 1.

Referring to the drawings in particular, a commissioning device 1 comprises a shelf 5 with product storage units 2, in which products are stacked, wherein a product of a selected product storage unit, which product is the lowermost product of the stack, can be pushed out by a positionable push-out unit 4 in the transverse direction of the shelf The shelf 5 is designed as a double shelf with middle guide rails 9 and at least one middle longitudinal conveying means 3 at the bottom of the shelf, especially a longitudinal conveyor belt, the push-out units 4 having two identical push-out means 12 each, which have a mirror-inverted design in relation to the vertical longitudinal central plane B of the double shelf, and each push-out means 12 being associated with one half of the double shelf.

The shelf 5 is designed as a plug-in frame system and has modular individual parts, the shelf being able to be built as a variable shelf in terms of height, width and/or length and being able to be expanded by attaching additional modular individual parts.

In particular, the shelf 5 is fitted together from vertical supports 6 of identical design and cross struts 7 of identical design, which can be brought into a positive-locking plug-in connection with the vertical supports in a selected position, as well as longitudinal struts 8. The shelf has, furthermore, guide rails 9, on which push-out units 4 can be guided movably in the longitudinal direction of the shelf for positioning the push-out unit at a selected product storage unit 2 and to which they are fastened. The shelf 5 is rigidly connected to the ground via the vertical supports 6 and underside fastening feet 21.

The shelf 5 has, furthermore, side parts 10 for the longitudinal conveying means 3 extending in the longitudinal direction of the shelf, on which commissioned products pushed out by positioned push-out units 4 can be given out and conveyed on this conveying means.

Figure 9:
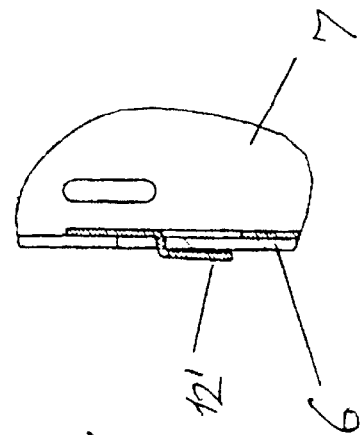
FIG. 9 is a schematic view of the connection of a vertical support to a cross strut.
Figure 8:
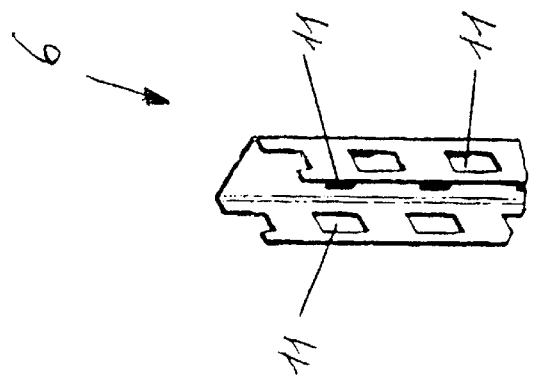
FIG. 8 is an enlarged perspective view of detail A according to FIG. 7.
Figure 7:
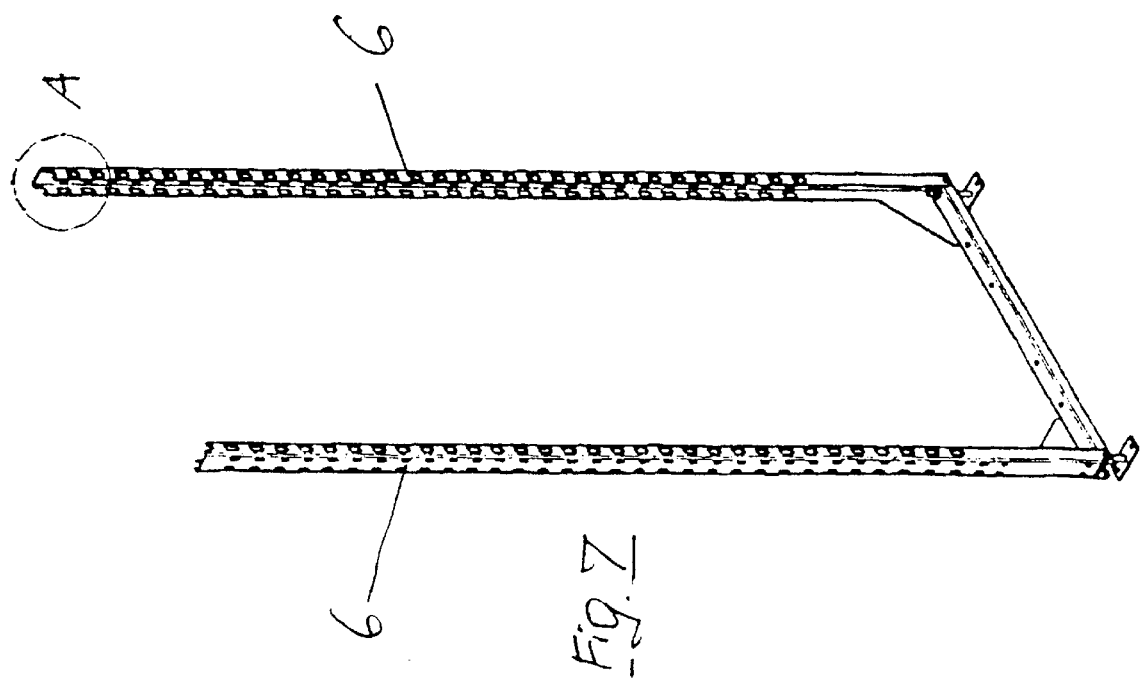
FIG. 7 is a perspective view of two vertical supports of the shelf part according to FIG. 6.

The vertical supports 6 are profile strips with holes 11 located at equally spaced locations from each other, into which end-side hook elements 12' of the cross struts 7 can be suspended in a positive-locking manner, as is apparent especially from FIGS. 7 through 9. The profile strips have a U-shaped cross section, and both the base and the two legs of the "U" have holes 11 located at equally spaced locations for suspending cross struts 7, longitudinal struts 8 as part of a plane that can be suspended and of wall covering elements 22, and an upper closing wall 23 can be suspended on the top side on the vertical supports 6.

The cross struts 7 are fitted together with the vertical supports 6 or are partially bolted together and/or fastened by securing pins 20, and the longitudinal struts 8 may also be fastened and especially bolted to the cross struts 7.

The product storage units 2 may also be fastened to the cross struts 7 and/or the longitudinal struts 8 by means of a plug-in connection.

In particular, the parts 7, 8 and 9 may be welded to one another and be suspended in the vertical support as modular components. The connection of part 7 to part 8 and part 9 may also be a plug-in connection or bolt connection. Part 8 is used as a strut to secure the lower edge level for the product storage unit 2 and as a possible locking means during the use of product storage units made of T-sections, sheet metal strips, etc.

The product storage units 2 themselves may also be designed as magazines that can be fitted together with a bottom-side product support and at least two side walls located at spaced locations from one another, which are preferably essentially vertical angle sections. Prior-art product storage units according to AT-PS 404 124 may be used.

The distance between the side walls located at spaced locations from one another may be set to or coordinated with the width of the product. The product width set or a plurality of set product widths preferably correspond to the horizontal distance between two adjacent cross struts 7 of a shelf 5.

Figure 13:
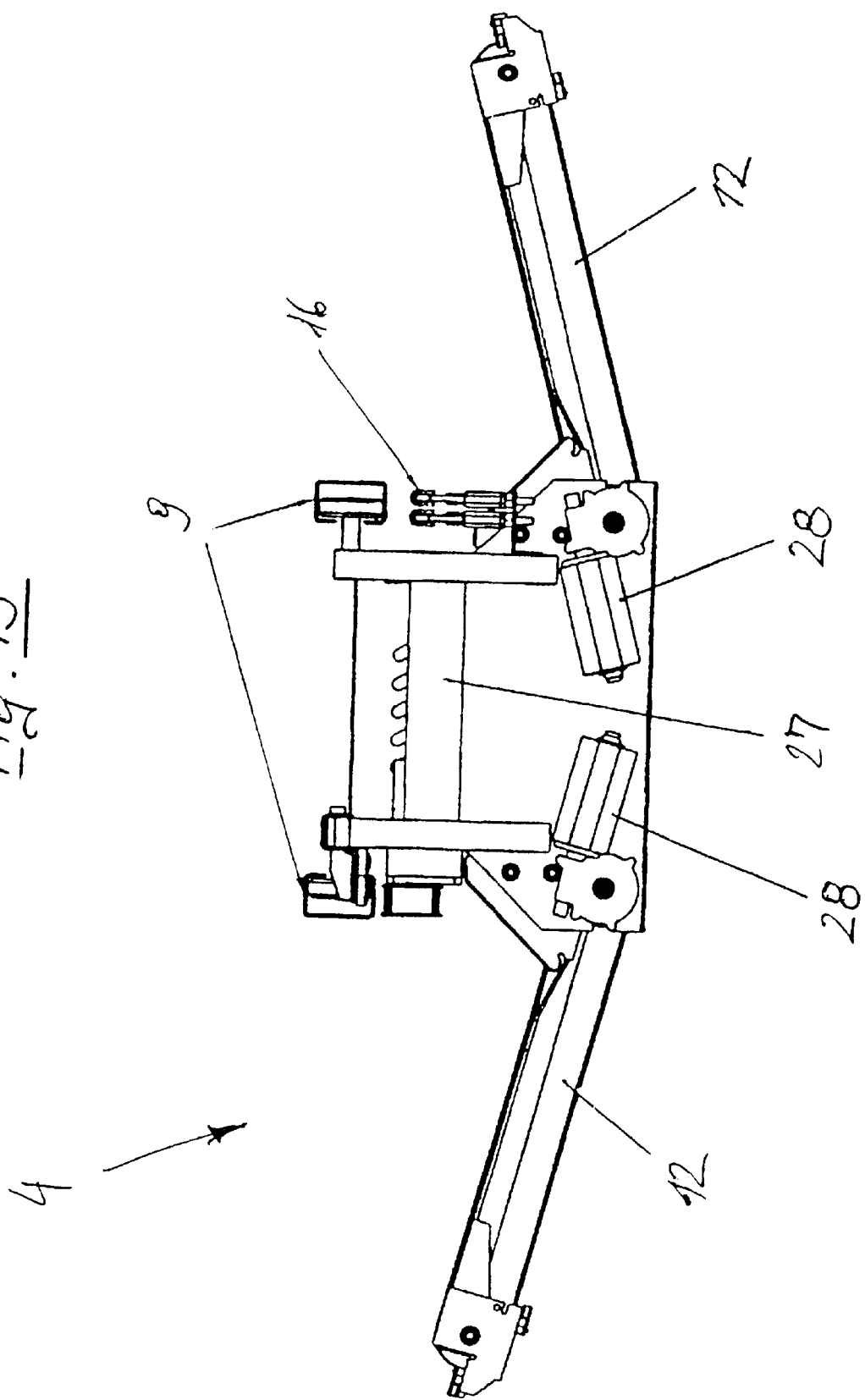
FIG. 13 is a perspective view of a push-out unit according to FIG. 10 without the upper cover with additional details.

Push-out units 4 as shown in FIGS. 10 through 13 are used in the commissioning device. In one arrangement of a push-out unit 4 in the shelf 5, the push-out unit is fastened suspended or standing at two guide rails 9 of a push-out plane, which guide rails are located at spaced locations from one another, and is guided in the longitudinal direction of the shelf 5. The product storage units 2 of the shelf, which are arranged in a longitudinal row, are sloped in relation to the vertical for a downwardly directed push-out movement of a product that is the lowermost product in the stack in the transverse direction of the shelf, and the two push-out means 12 of each push-out unit 2, which are of identical design, are arranged obliquely in the transverse direction of the shelf and can be positioned at a close, parallel distance under the lowermost product of the stack under a selected product storage unit. To ensure the possibility of accurate positioning at the product storage units, the push-out unit 4 is guided accurately by means of driven vertical rollers 25 and by means of horizontal guide rollers 26 in the guide rails 9, which have a U-shaped cross section, as is apparent from FIG. 13 compared with FIG. 11.

The cross struts 7 are arranged not only horizontally in one push-out plane, but also at different levels, as is apparent especially from FIG. 6, and each individual level defines a push-out plane E1, E2, E3, E4, E5, E6 and E7 with associated product storage units 2, guide rails 9 and push-out unit 4, and a separate longitudinal conveying means 3 extending in the longitudinal direction of the shelf may be associated with each push-out plane.

The push-out units 4 have an activatable longitudinal drive 27 of their own as well as an activatable cross drive 28 of their own for the push-out means 12, and the longitudinal drive may also be fastened to the shelf and may be connected to the push-out unit 4 via a drive, preferably a belt drive.

The push-out units 4 are supplied with electricity from a battery or via electric sliding contacts 15 and a conductor rail 16 arranged on the longitudinal side of the shelf.

Each push-out unit 4 is activated by means of a data light barrier, radio or by modulating the control signals via the conductor rail 16.

To push out products to the middle of the shelf and to give them out without problems especially in the case of a double shelf with a central longitudinal conveying means 3 from a selected lateral product storage unit by means of one of the two lateral push-out means 12 of the push-out unit 4, a cross-conveying means 29 for the products, which is a rigid part of the shelf and is preferably a cascade or a chute plate, is provided between the push-out opening of the product storage unit 2 and the longitudinal conveying means 3. A buffer hopper has a conical filling opening and a bottom-side flap. If the flap is closed, the buffer hopper acts as a storage unit. If the flap is opened, the commissioned products are ejected onto the central conveyor belt.

Depending on the local conditions, the size and the capacity of the commissioning device, not only can the individual shelves to be mounted be prepared rapidly and in a variable manner in the modular design according to the modular principle according to the present invention, but a plurality of individual shelves and/or double shelves may also be arranged in parallel to one another and/or opposite each other, and each outlet 17 of a longitudinal conveying means 3, which outlet is located on the longitudinal side of the shelf, may be connected to a central belt or collecting conveying means 18, which preferably extends at right angles to the longitudinal conveying means 3 and leads to a transfer point 24. An aforementioned, complex commissioning device 1 is shown, e.g., in a schematic diagram in FIG. 14. The arrangement is such that connecting conveying means 19, especially an ascending belt, a chute or a buffer hopper, are also provided between the outlets 17 of the longitudinal conveying means 3 and the collecting conveying means 18.

While specific embodiments of the invention have been shown and described in detail to illustrate the application of the principles of the invention, it will be understood that the invention may be embodied otherwise without departing from such principles.

What is claimed is:

1. A commissioning device comprising:
   a shelf;
   product storage units arranged in the shelf in positions ranging from vertical to horizontal, in which products are stacked one on top of another or next to one another in a row; and
   a push-out unit for pushing out the lowermost or frontmost product of the stack of a selected product storage unit in the transverse direction of the shelf, the shelf being provided as a frame components system with a plug-in frame system, the shelf comprising modular individual parts, wherein the shelf has a variable design in terms of height, width and/or length and is expandable by attaching additional modular individual parts.

2. A commissioning device in accordance with claim 1, wherein the shelf is composed from at least four vertical supports of an identical design and at least two cross struts of an identical design, the cross struts being fastened to the vertical supports in a selected position with a positive-locking plug-in connection, as well as at least one longitudinal strut, and a guide rail, the push-out unit being guided movably on said guide rail in the longitudinal direction of the shelf for positioning the push-out unit at a said selected product storage unit and fastened.

3. A commissioning device in accordance with claim 1, wherein the shelf has a fastening rail with a longitudinal conveying means extending in the longitudinal direction of the shelf on which a commissioned product pushed out by the positioned push-out unit can be given out and removed.

4. A commissioning device in accordance with claim 2, wherein at least one additional shelf as part of a frame components plug-in frame system with a plug-in connection is connected to or associated with the shelf, said additional shelf being one of:
   a commissioning shelf with a guide rail, a push-out unit, a buffer hopper and the longitudinal conveying means; and
   a non-commissioning shelf without a push-out unit and without product storage units, without a guide rail and also without the longitudinal conveying means, and has shelf bottoms, arranged on the cross struts at different levels, on which products can be arranged, intermediately stored and handled.

5. A commissioning device in accordance with claim 4, wherein the additional shelf is convertible to a commissioning shelf.

6. A commissioning device in accordance with claim 4, wherein the commissioning shelf is convertible to a commissioning additional shelf.

7. A commissioning device in accordance with one of claim 2, wherein the vertical supports are profile strips with holes spaced at distances from one another, said holes receiving end-side hook elements of the cross struts in a positive-locking manner for suspension.

8. A commissioning device in accordance with claim 7, wherein the profile strip has a U-shaped cross section, and both the base and the two legs of the U-shaped profile strip have equidistant holes for suspending a cross strut and/or a longitudinal strut.

9. A commissioning device in accordance with claim 8, wherein the cross struts can be bolted to the vertical supports and/or can be fastened to same by means of securing pins, and the longitudinal struts are bolted or welded to the cross struts.

10. A commissioning device in accordance with claim 8 wherein the product storage units are fastenable to the cross struts and/or the longitudinal struts by a plug-in connection.

11. A commissioning device in accordance with one of the claim 1, wherein the product storage unit includes a magazine that can be fitted together with a bottom-side product support and at least two side walls, located at spaced locations from one another, as vertical angle sections.

12. A commissioning device in accordance with claim 11, wherein a distance between the side walls located at spaced locations from one another can be set to or coordinated with the width of the product, and the set product width or a plurality of set product widths corresponds/correspond to the horizontal distance between adjacent cross struts.

13. A commissioning device in accordance with claim 1, wherein the product storage units arranged in a longitudinal row are sloped relative to the vertical for an obliquely downwardly directed push-out movement of a product that is the lowermost product of the stack in the transverse direction of the shelf.

14. A commissioning device in accordance with claim 2, wherein the cross struts are arranged at different levels and every individual level defines a push-out plane with the associated product storage units, a guide rail and a push-out unit, and a separate longitudinal conveying means extending in the longitudinal direction of the shelf may be associated with each push-out plane.

15. A commissioning device in accordance with claim 2, further comprising a product cross conveying means including one of a conveying chute, an ascending belt or a buffer hopper, the product cross conveying means being a rigid part of the shelf provided between the push-out opening of the product storage unit and the longitudinal conveying means.

16. A commissioning device in accordance with claim 2, wherein the push-out unit is arranged in a suspended manner and longitudinally movably on the guide rail, and a plurality of push-out units are provided at a single guide rail.

17. A commissioning device in accordance with claim 1, wherein the push-out unit has at least one push-out means for pushing out a product of a selected product storage unit, which product is the lowermost product of the stack, in the transverse direction of the shelf.

18. A commissioning device in accordance with claim 1, wherein the push-out unit has a separate activatable longitudinal drive as well as a separate activatable cross drive for the push-out means, and the longitudinal drive is fastened to the shelf and connected to the push-out unit by means of a toothed belt drive.

19. A commissioning device in accordance with claim 1, wherein the push-out unit is supplied with electricity from a battery or via electric sliding contacts and a conductor rail extending in the longitudinal direction of the shelf.

20. A commissioning device in accordance with claim 1, wherein the push-out unit is activated by means of a data light barrier, radio or by modulation from the conductor rail.

21. A commissioning device in accordance with claim 2, wherein the shelf is designed as a double shelf with at least one middle guide rail and a longitudinal conveying means in the middle, wherein the push-out unit has two said push-out means having a mirror-inverted design in relation to the vertical longitudinal central plane of the double shelf, and each push-out means is assigned to one half of the double shelf.

22. A commissioning device in accordance with claim 1, wherein a plurality of shelves and/or double shelves are arranged in parallel to one another and/or opposite each other and one behind the other, and a longitudinal conveying means has an outlet located on a longitudinal side of the shelf, connected to a central belt or to a collecting conveying means extending preferably at right angles to the longitudinal conveying means and is a central conveyor belt of the shelves arranged opposite each other or a lateral conveyor belt of shelves arranged in parallel.

23. A commissioning device in accordance with claim 22, further comprising a connecting conveying means with an ascending belt, a chute or a buffer hopper arranged between the outlets of the longitudinal conveying means and the collecting conveying means.

24. A commissioning device in accordance with claim 1, wherein the push-out unit has at least one separate product storage unit for receiving and passing on commissioned, pushed-out products to a transfer point, which is preferably located at the longitudinal end of the shelf.

25. A commissioning device in accordance with claim 1, wherein the shelf or shelves have at least one walkable operating platform, which may be arranged at a different level laterally from the shelf and/or at a longitudinal end of the shelf by means of a plug-in connection.

26. A commissioning device in accordance with claim 1, wherein the shelf or shelves has/have at least one lateral shelf ladder for a human operator, which is displaceable or can be suspended.

27. A commissioning device in accordance with claim 2, wherein the guide rail has, at least at one longitudinal end of the shelf, an openable stop for a longitudinally movable push-out unit guide rail piece pivotably articulated to the end of the guide rail and forming a stop for the push-out unit on the guide rail in a transverse position and releases the push-out unit in a preferably aligned longitudinal position, and which especially establishes a connection to a service site or exchange site for push-out units.

* * * * *